United States Patent [19]

Ichinohe et al.

[11] 3,877,039

[45] Apr. 8, 1975

[54] EXPOSURE CONTROL SYSTEM FOR CAMERAS

[75] Inventors: Eisuke Ichinohe, Katano; Masaya Shimomura; Yuji Tsuda, both of Hirakata; Junji Kajiwara, Kadoma, all of Japan

[73] Assignee: Matsushita Electric Industrial Co., Ltd., Osaka, Japan

[22] Filed: Nov. 20, 1972

[21] Appl. No.: 307,969

[30] Foreign Application Priority Data

| | | |
|---|---|---|
| Nov. 24, 1971 | Japan | 46-94775 |
| Nov. 24, 1971 | Japan | 46-94794 |
| Nov. 24, 1971 | Japan | 46-94795 |
| Nov. 24, 1971 | Japan | 46-94796 |
| Aug. 9, 1972 | Japan | 47-80209 |
| Aug. 9, 1972 | Japan | 47-80210 |
| Aug. 9, 1972 | Japan | 47-80211 |
| Aug. 9, 1972 | Japan | 47-80212 |
| Aug. 9, 1972 | Japan | 47-80213 |
| Aug. 9, 1972 | Japan | 47-80214 |
| Apr. 25, 1972 | Japan | 47-41837 |
| Apr. 25, 1972 | Japan | 47-41838 |
| Apr. 25, 1972 | Japan | 47-41839 |
| Apr. 25, 1972 | Japan | 47-41840 |
| Apr. 25, 1972 | Japan | 47-41841 |
| Apr. 25, 1972 | Japan | 47-41842 |
| Apr. 25, 1972 | Japan | 47-41843 |
| Apr. 25, 1972 | Japan | 47-41844 |

[52] U.S. Cl. .......... 354/24; 354/51
[51] Int. Cl. .......... G03b 7/08
[58] Field of Search .......... 95/10 CT; 354/24, 51

[56] References Cited

UNITED STATES PATENTS

| | | | |
|---|---|---|---|
| 3,670,637 | 6/1972 | Mori et al. | 95/10 CT |
| 3,678,826 | 7/1972 | Mori et al. | 95/10 CT |
| 3,679,905 | 7/1972 | Watanabe | 95/10 CT |
| 3,690,230 | 9/1972 | Mori et al. | 95/10 CT |
| 3,736,851 | 6/1973 | Ono et al. | 95/10 CT |

FOREIGN PATENTS OR APPLICATIONS

| | | | |
|---|---|---|---|
| 44-19747 | 8/1969 | Japan | 95/10 CT |

OTHER PUBLICATIONS

Hart & Mulder, "An All-Silicon Timing Circuit for Automatic Cameras," 1970, Microelectronics & Reliability, pp. 335–340.

*Primary Examiner*—Samuel S. Matthews
*Assistant Examiner*—Russell E. Adams, Jr.
*Attorney, Agent, or Firm*—Stevens, Davis, Miller & Mosher

[57] ABSTRACT

An exposure control system for use with single lens reflex cameras in which a photo-diode is connected across first and second inputs of a differential amplifier, and first and second variable resistors are connected at one end to the first and second differential amplifier inputs, respectively, and at the other ends in common with a power source, the resistors being variable as a function of film speed adjustment and lens aperture adjustment, respectively, the output of the differential amplifier being negatively fed back to one of its inputs such that the amplification factor of the photo-current generated by the photo-diode is the ratio of the first and second resistors.

16 Claims, 8 Drawing Figures

EXPOSURE CONTROL SYSTEM FOR CAMERAS

The present invention relates to an exposure control means for a camera or the like in which the amount of light is measured to determine the shutter speed in accordance with the measured amount of light.

In a single lens reflex camera having an electromagnetically controlled shutter means, it has been known to provide a photo sensing element in a light path of a finder optical system. However, in such an arrangement, since a reflecting mirror for reflecting the light through the object lens toward the finder optical system is pulled up just before the shutter is actuated, the incident light on the photo sensing element is interrupted so that it is impossible to obtain a correct exposure. In view of this fact, it has been proposed to memorize the amount of light just before the mirror flips up and determine the shutter speed in accordance with the memorized value. As the photo sensitive element, Cadmium Sulfide (CdS) is commonly used because it is highly sensitive and can be made compact. However, since CdS has a relatively long response time, when it is desired to take a picture by suddenly moving a camera from a bright position to a relatively dark position, it is impossible to obtain a correct exposure value if the shutter is immediately actuated.

It has also been known to use as the photo sensitive element a silicon photo diode which is sensitive to visible light. The silicon photo diode has a substantially improved response time as compared with CdS, and is excellent in reliability and compactness. However, it is disadvantageous in that it is less sensitive than CdS and the measurable range is limited by the dark current inherent thereto; this is because it no longer has a linear light to current characteristic under a relatively dark condition due to relative increase in the dark current.

Heretofore, where a silicon photo-diode was used as a photo-sensitive element, either a reverse biasing voltage was applied thereto to produce a photo-current or a photo-emf was used to produce a forward voltage. In such cases, the silicon photo-diode always has an equivalent parallel resistance component (dark current or leak current) so that the detection of a weak incident light has not been possible, resulting in a narrow range of light intensity measurement. As a result, in a camera in which the lens aperture diaphragm is preset, it has been difficult to measure the amount of light while the lens aperture was reduced (so-called light amount measurement under reduced aperture diaphragm). Also, in the prior art system, depending on the change in the incident light which is required for effecting the light amount measurement under reduced aperture diaphragm, a fast output signal response has been restricted by the capacitance of the silicon photo-diode and hence the realization of the light amount measurement under reduced aperture diaphragm has been difficult. Furthermore, in the prior art system, since the photo-current or the photo-voltage is amplified to control the shutter time, the only factor that may be readily altered is the amplification factor of the amplifier. However, when a camera including three adjustable factors, such as preset and release of the lens aperture diaphragm, the film sensitivity or the like, is used, it has been difficult to change these factors simultaneously.

The present invention has an object to provide exposure control means for a camera which can eliminate the aforementioned disadvantages and provide a correct control of shutter speed under an increased light brightness range.

According to an aspect of the present invention, a silicon photo diode is inserted between two input terminals of the differential amplifier, the output of an amplifying circuit including the differential amplifier is fed back to one of the inputs in a negative feedback arrangement, so that the silicon photo diode is used under a substantially zero-bias whereby the photo current is amplified by the ratio of resistances respectively inserted between the electric power supply and two input terminals, and the amplified current is used to charge a timing capacitor to determine the shutter speed.

Furthermore, according to the present invention since the output of the differential amplifier is fed back to the silicon photo-diode, a rapid response is attained, which enables the light amount measurement to be obtained using a reduced aperture diaphragm.

Furthermore, according to the present invention, two resistors connected to the input terminal can be varied independently whereby the preset and release of the lens aperture diaphragm and the change of the film sensitivity are facilitated.

The above and other objects and features of the present invention will become apparent from the following descriptions of preferred embodiments of the present invention with reference to the accompanying drawings, in which.

Figure 1:
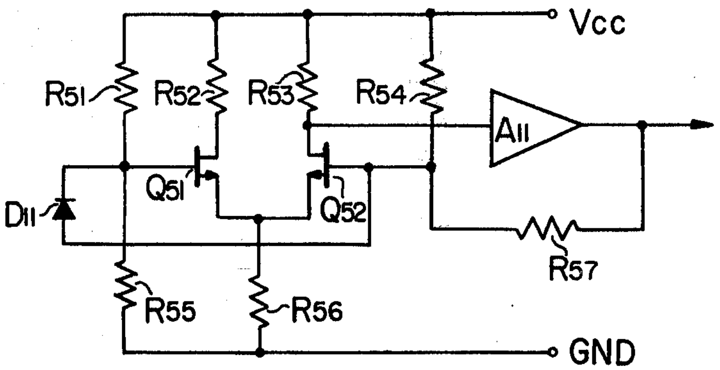
FIG. 1 is a circuit diagram for explaining the principle of the exposure control means of the present invention.

The operation of the exposure control means in accordance with the present invention will now be described with respect to the example shown by a circuit diagram in FIG. 1. In the drawing, there is shown a differential amplifier comprising resistors $R_{51}$, $R_{52}$, $R_{53}$, $R_{54}$, $R_{55}$, $R_{56}$ and $R_{57}$ and field effect transistors (FET) $Q_{51}$ and $Q_{52}$, the output of the differential amplifier being amplified by a negative feedback amplifier $A_{11}$ and fed back in the form of the output of the amplifier $A_{11}$ through the resistor $R_{57}$ into the gate of FET $Q_{52}$. A photo diode $D_{11}$ is connected between the gates of the field effect transistors $Q_{51}$ and $Q_{52}$ with the polarity that the transistor $Q_{52}$ is subjected to a positive potential when light is injected on the diode. Thus, when the photo diode $D_{11}$ is illuminated, a photo current is allowed to flow therein, whereby the gate of the transistor $Q_{52}$ is biased by a positive potential reducing the drain potential of the transistor $Q_{52}$. This output is amplified by the amplifier $A_{11}$ to be used for controlling shutter means. A portion of the output of the amplifier $A_{11}$ is fed back through the resistor $R_{57}$ to the gate of the transistor $Q_{52}$. This feedback voltage is applied in the direction opposing the voltage produced in the photo diode $D_{11}$, so that there is no remarkable change in the gate voltage of the transistor $Q_{52}$.

Figure 2:
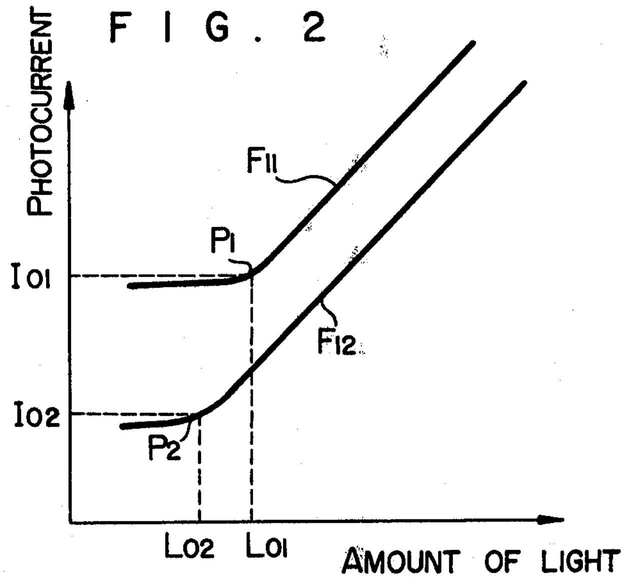
FIG. 2 is a diagram showing the relationship between the amount of incident light and the photo current in the silicon photo diode.

The characteristic of the photo diode will now be described with reference to FIG. 2. When the photo diode is subjected to a reverse bias, the amount of the photo current I with respect to a predetermined amount of light increases and thus the apparent sensitivity of the photo diode is increased, however, this is usually accompanied by an increase in the dark current. Therefore, under a relatively dark condition, it is impossible to obtain a photo current proportional to the amount of light due to the effect of the dark current. Referring to FIG. 2, the relationship between the amount of light and the photo current under this condition is shown by the curve $F_{11}$. At the point $P_1$ on the curve $F_{11}$, the effect of the dark current appears and it becomes impossible to detect the change in the photo current. Thus, it is impossible to detect change in light under the amount of light below $Lo_1$.

When there is no bias on the photo diode, it becomes impossible to detect change in photo current at the point $P_2$ corresponding to the amount of light $Lo_2$ as shown by the curve $F_{12}$ in FIG. 2. Thus, when the photo diode is used without any bias, the photo sensitive range of the diode is expanded as compared with the diode used with bias voltage from the point corresponding to the amount of light $Lo_1$ to the point corresponding to the amount of light $Lo_2$. In general, when a photo current is amplified, it is usually necessary to apply a bias to the photo diode in order to bring the current level to the amplifying zone of semi-conductor elements; however, according to the present invention, mutual compensation is expected at the opposite ends of the diode so that it is possible to make the bias substantially zero.

Figure 3:
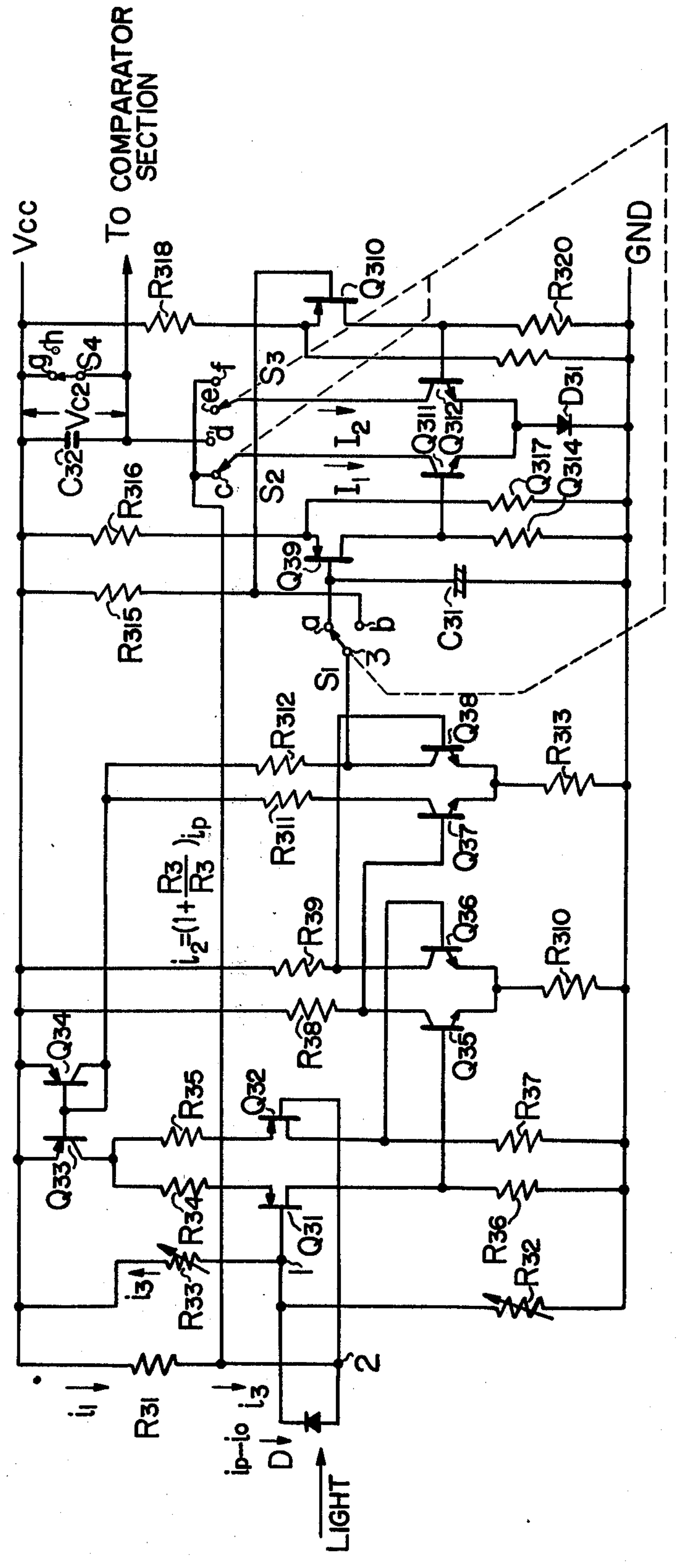
FIG. 3 is a circuit diagram showing one embodiment of the exposure control circuit in accordance with the present invention.

A preferred embodiment of the present invention will now be described with reference to FIG. 3. In the circuit shown in FIG. 3, an electric power supply (not shown) is provided for providing a voltage Vcc. Before a picture is taken, switch $S_1$ is brought into a position *a*, switch $S_2$ into a position *c*, switch $S_3$ into a position *e*, and switch $S_4$ into a position *g*. Then, a shutter release button (not shown) is depressed. This operation causes the aperture stop of the camera to be moved to a predetermined position, so as to allow a predetermined amount of light to pass through the object lens of the camera. A photo diode receives at least a portion of the light and produces a photo current corresponding to the amount of the light. Representing the current by the character $i_p$, the following relation is established in the circuit shown in FIG. 3;

$$\begin{cases} i_1 = i_2 + i_3 & (1) \\ i_3 = i_p + i_0 & (2) \end{cases}$$

where, $i_o$ represents a current component through the photo diode other than the photo current.

Further, representing the gate voltage of field effect transistors $Q_{31}$ and $Q_{32}$ by the characters $v_2$ and $v_1$, respectively, and the gain of three stages of differential amplifiers comprising the field effect transistors $Q_{31}$ and $Q_{32}$, and transistors $Q_{35}$, $Q_{36}$, $Q_{37}$ and $Q_{38}$ by the character A, the output voltage $v_3$ of the transistor $Q_{38}$ has the following relation with the voltage $v_1$ and $v_2$ and the gain A;

$$(v_1 - v_2)A = v_3 \quad (3)$$

Further, the voltages $v_1$ and $v_2$ have the following relation with the power supply voltage Vcc;

$$v_1 = Vcc - R_{31} \times i_1 \quad (4)$$

$$v_2 = Vcc + R_{33} \times i_3 \quad (5)$$

From the equations (3), (4) and (5), the following equation can be obtained;

$$(R_{33}i_3 + R_{31}i_1)A = -v_3 \quad (6)$$

In the embodiment, since the gain A of the three stages of differential amplifiers is selected as being sufficiently high, the following relation can be obtained;

$$-R_{33}i_3 = R_{31}i_1 \quad (7)$$

Since, in this instance, there is no potential difference between the opposite ends of the diode;

$$i_o = i_3 + i_p = 0 \quad (8)$$

From the equations (1) and (7);

$$i_2 = (1 + R_{31}/R_{33})i_1 \quad (9)$$

From the equations (7) and (9);

$$i_2 = -\left(1 + \frac{R_{33}}{R_{31}}\right) i_3 \quad (10)$$

From the equations (8) and (10);

$$i_2 = (1 + R_{33}/R_{31})i_p \quad (11)$$

From the equation (11), it will be apparent that a current proportional to the current $i_p$ through the photo diode flows through the transistor $Q_{311}$. The output of the amplifier is fed back negatively through the transistor $Q_{311}$ to the input. Due to the negative feedback connection, the terminal voltage of a storage capacitor $C_{31}$, connected to the gate of the transistor $Q_{39}$ can be maintained at a predetermined voltage in accordance with the amount of light.

The time response in the present circuit will now be described. Assume that $R_{31}$ represents a load resistance of the differential amplifier and $A_T>>1$) represents an amplification factor in the absence of the negative feedback. Also, assume that $i_p$ represents a photocurrent and $R_{31} + R_{33}$ represents a load resistance of the silicon photo-diode in the absence of negative feedback.

Then, the voltage across the silicon photo-diode is given by $i_p X(R_{31}+R_{33})$. On the other hand, when negative feedback is provided, the voltage across the silicon photo-diode is given by $1/A_T + 1.i_p.R_{33}$. Accordingly, when negative feedback is applied, if $R_{33}>>R_{31}$, the voltage of the silicon diode that must be charged by the photo-current is reduced by the factor of approximately $A_T$ and the response time is shortened by the factor of approximately $A_T$.

Thus, before the reflecting mirror of the camera is pulled up, the measurement of light is completed and an electrical charge corresponding to the measured light is stored in the capacitor $C_{31}$. Thereafter, the switches $S_1$, $S_2$ and $S_3$ are actuated to close the contacts *b*, *d* and *f*, respectively, leaving the switch $S_4$ in the position closing the contact *g*. Then the current substantially equal in amount with the current which has been flowing through the resistor $R_{31}$ is allowed to flow through the switch $S_4$ to the transistor $Q_{311}$.

When the reflecting mirror of the camera is pulled up, the light toward the photo diode is interrupted so that the photo diode allows only the dark current to pass therethrough. Representing the dark current which flows in this instance through the photo diode by the character $i_{dark}$, the current through the transistor $Q_{312}$ can be represented as follows.

$$I_2 = (1 + R_{33}/R_{31})i_{dark}$$

Since the transistors $Q_{311}$ and $Q_{312}$ constitute a constant current driven differential amplifier, the sum of the collector current $I_1$ of the transistor $Q_{311}$ and the collector current $I_2$ of the transistor $Q_{312}$ is always constant. Therefore, the current $I_1$, which flows through the collector of the transistor $Q_{311}$ during the period from the completion of the measurement of the amount of light to the return of the reflecting mirror, will be $(1 + R_{33}/R_{31})(i_p - i_{dark})$ which is the difference between the current $(1 + R_{33}/R_{31})i_p$ which is proportional to the amount of light just before a picture is taken and the dark current. When the mirror is pulled up, the shutter is simultaneously opened and, at the same time, the switch $S_4$ is actuated to move from the position *g* to the position *h*, so that the current through the switch $S_4$ and the transistor $Q_{312}$ is interrupted. Thus, the time integrating capacitor $C_{32}$ is gradually charged. Representing the potential difference between the opposite ends of the capacitor $C_{32}$ by the character $Vc_2$, and the charging time by *t*, the following relationship is established.

$$Vc_2 = (1 + R_{33}/R_{31}).(i_p - i_{dark}).(t/C_{32})$$

When the voltage $Vc_2$ reaches a predetermined value, a transistor in a time setting comparator is cut off, so as to initiate the closing movement of the shutter.

Figure 4:
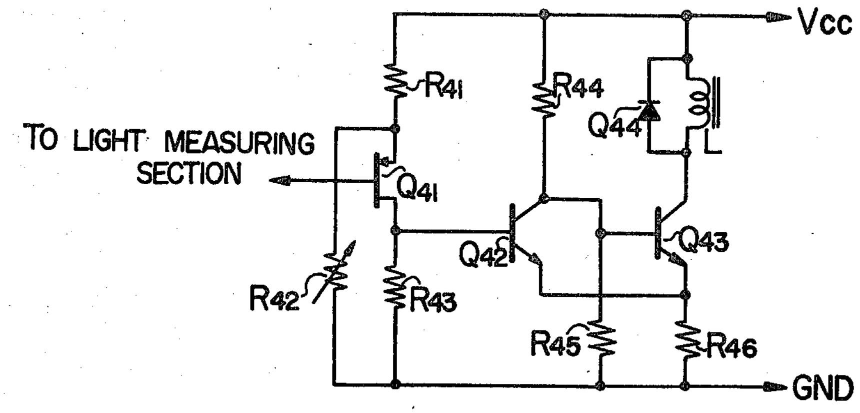
FIG. 4 is a circuit diagram showing one example of comparing circuit.
Figure 5:
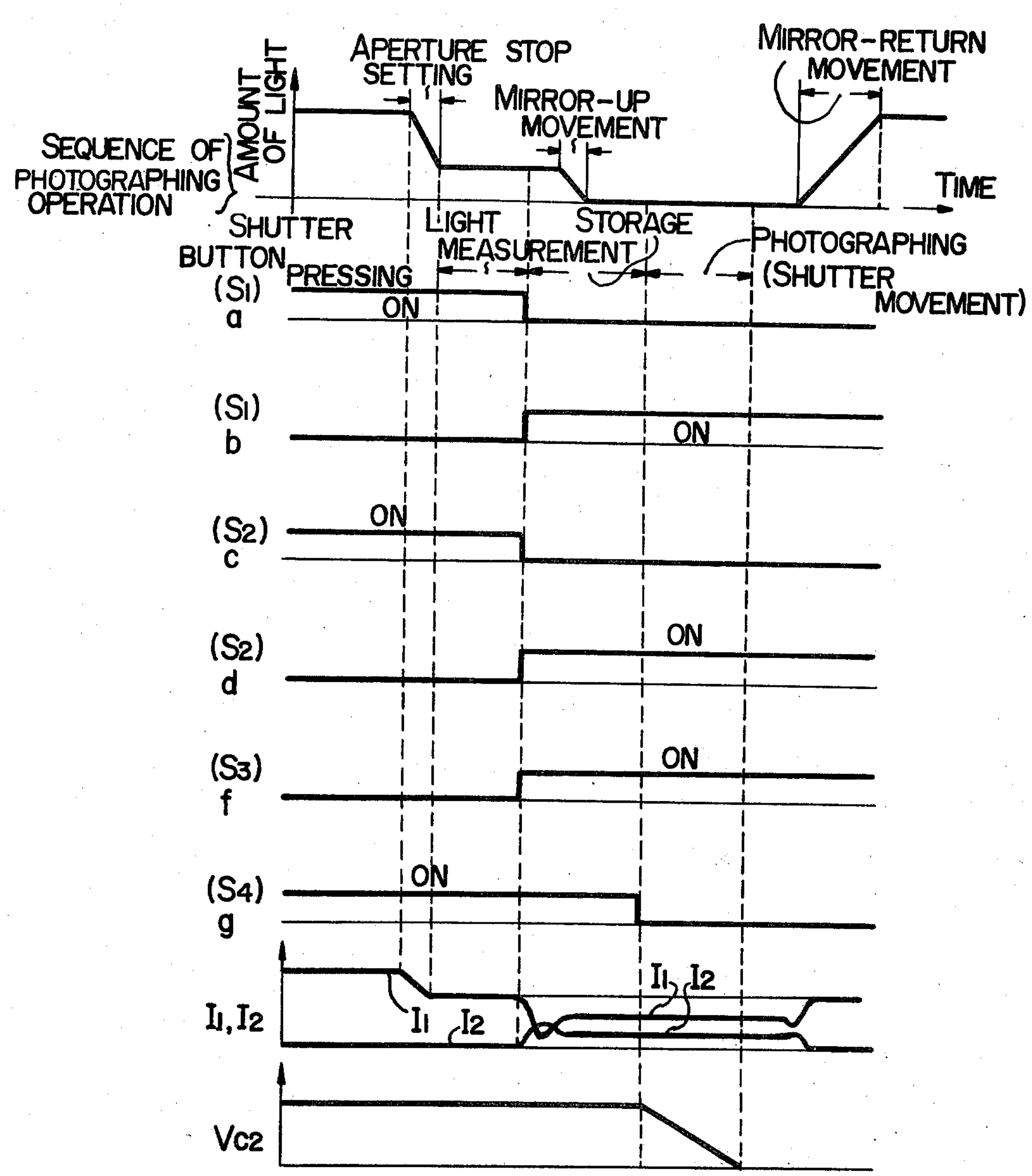
FIG. 5 is a diagram showing timing relation in a photographing operation.

The comparator may comprise a circuit as shown in FIG. 4. In operation of the circuit, when the first curtain of the shutter mechanism is moved to open the shutter, the switch $S_4$ shown in FIG. 3 is moved to the position *h* so as to initiate the charging of the capacitor $C_{32}$. In this instance, since the gate potential of the transistor $Q_{41}$ is greater than the source potential of the transistor $Q_{41}$, the transistor $Q_{41}$ is pinched off and therefore the transistor $Q_{42}$ is in the off condition while the transistor $Q_{43}$ is in the on condition to allow the current to flow through the solenoid L. Thus, the shutter is held in the open position. As the voltage charged across the capacitor $C_2$ increases, the gate potential is decreased and finally the transistor is turned on. Thus, the transistor $Q_{42}$ is brought into the on condition while the transistor $Q_{43}$ is turned off to block the current to the solenoid L. Thus, the shutter is caused to close. Referring to FIG. 5, there are shown a change in the amount of light during operation of a camera, the operation of the switches $S_1$, $S_2$, $S_3$ and $S_4$, change in current flowing through the transistors $Q_{311}$ and $Q_{312}$ and change in the voltage $Vc_2$ across the time integrating capacitor, with time taken as a parameter.

Figure 6:
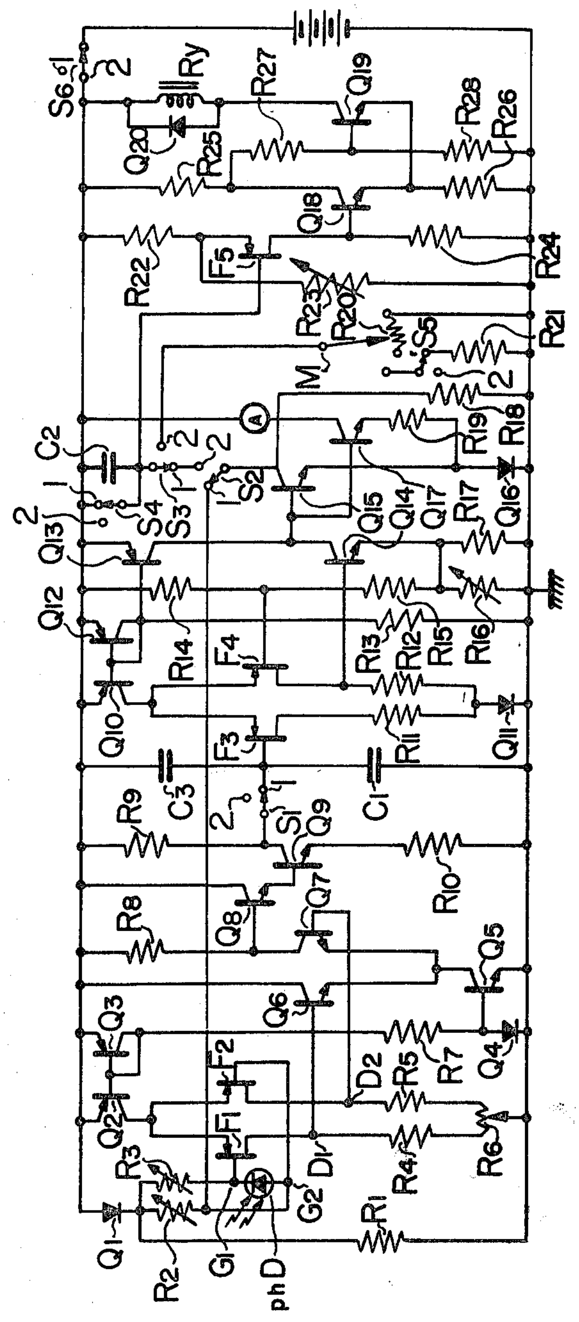
FIG. 6 is a circuit diagram of a further embodiment of the present invention.

Referring to FIG. 6, there is shown an electrical circuit in accordance with the second embodiment of the present invention, which includes a resistor $R_1$ connected at one end with a diode $Q_1$ and at the other end with ground. The characters $F_1$ and $F_2$ designate P-channel junction type field effect transistors constituting a constant current driven differential amplifier having a constant current circuit including PNP type transistors $Q_2$ and $Q_3$ disposed between the electric power supply and a common source. The common mode gain of the amplifier is sufficiently small as compared with the differential mode gain, and a sufficient compensation is provided for the variation of the power supply voltage. The compensation for the thermal effect is also provided in constituting the differential amplifier. A silicon photo diode Ph.D is inserted between the gate $G_1$ of the transistor $F_1$ and the gate $G_2$ of the transistor $F_2$ with the P-terminal connected with the gate $G_2$ and the N-terminal with the gate $G_1$. When the light is measured with the lens aperture of a camera positioned at a preselected position, the resistor $R_2$ may be a fixed resistor but, when the light is measured with the lens aperture fully opened, the resistor $R_2$ must be a variable resistor which is interconnected with the lens aperture actuating mechanism. The resistors $R_4$ and $R_5$ are respectively connected at one of their ends with the drain $D_1$ of the transistor $F_1$ and the drain $D_2$ of the transistor $F_2$, with the other ends connected to the opposite ends of a variable resistor $R_6$. The variable resistor $R_6$ is provided for adjusting the unbalance between the transistors $F_1$ and $F_2$ as well as the unbalance between the resistors $R_4$ and $R_5$, and has a central tap connected to the ground. The character $Q_4$ designates a diode, and $Q_5$, $Q_6$ and $Q_7$ NPN type transistors. The bases of the NPN type transistors $Q_6$ and $Q_7$ are connected to the drains $D_1$ and $D_2$, respectively, with the common emitter connected with the constant current circuit comprising the diode $Q_4$ and the NPN type transistor $Q_5$. The NPN type transistors $Q_6$ and $Q_7$ also provide a constant current differential amplifier. A resistor $R_7$ is provided for determining the current to be directed through the constant current circuit for the differential amplifier comprising the transistors $F_1$ and $F_2$ and that for the differential amplifier comprising the NPN transistors $Q_6$ and $Q_7$. The collector of the NPN type transistor $Q_6$ is directly connected to the power supply, and the collector of the NPN type transistor $Q_7$ to a resistor $R_8$ and the base of a NPN type transistor $Q_8$. The emitter of the NPN type transistor $Q_8$ is connected with the base of a NPN type transistor $Q_9$ and the collector with the power supply. The arrangement of the NPN type transistors $Q_8$ and $Q_9$ are considered as a kind of "Darlington" type connection which receives the output voltage of the NPN type transistor $Q_7$ at a high input impedance to amplify it. The characters $R_9$ and $R_{10}$ designate respectively an emitter resistor and a collector resistor for the NPN type transistor $Q_9$, for taking out the output of the NPN transistor $Q_9$ and applying it through the switch $S_1$ to a storage capacitor $C_1$ and the gate of the transistor $F_3$. A capacitor $C_3$ is connected between the power supply and the gate of the transistor $F_3$ for compensating leak current due to the self discharge of the capacitor $C_1$. The capacitor $C_3$ makes it possible to store the charge for an extended time. There is also provided a constant current driven differential amplifier including a circuit which comprises field effect transistors $F_3$ and $F_4$ , PNP type transistors $Q_{10}$ and $Q_{12}$, and diode $Q_{11}$, and resistors $R_{11}$, $R_{12}$ and $R_{13}$, in which the gate voltage of the transistor $F_4$ is determined by resistors $R_{13}$, $R_{14}$, $R_{16}$ and $R_{17}$. The diode $Q_{11}$ is provided for compensating thermal effect on the NPN type transistor $Q_{14}$. The output of the constant current differential amplifier including the field effect transistors $F_3$ and $F_4$ are taken out from the drain of the transistor $F_4$ and applied to the base of the NPN type transistor $Q_{14}$. The PNP type transistor $Q_{13}$ allows a constant current to pass therethrough due to the existence of the PNP type transistor $Q_{12}$ and the resistor $R_{13}$. The constant current is equal to the sum of the collector current of the NPN type transistor $Q_{14}$ and the base current of the NPN type transistor $Q_{15}$. In this arrangement, under a dark condition, the base potential of the NPN type transistor $Q_{14}$ increases, so that the collector potential of the transistor $Q_{14}$ and therefore the base potential of the NPN type transistor $Q_{15}$ are decreased. As a result, the collector current of the transistor $Q_{15}$ is decreased. Under a bright condition, a reverse result is obtained. Thus, the collector current of the transistor $Q_{15}$ is proportional to the amount of light. From the relationship between the light and the collector current, it should be noted that the shutter speed is increased under a bright condition and decreased under a dark condition. The collector of the NPN type transistor $Q_{15}$ is connected through the position 1 of the switch $S_2$ with the gate $G_2$ of the transistor $F_2$ to constitute a negative feedback circuit. Further, the contact 2 of the switch $S_2$ is connected with the contact 1 of a selector switch $S_3$ which is provided for the selection of an "automatic" position in which the shutter speed is automatically determined and a "manual" position in which the shutter speed is manually determined as desired. The switch $S_3$ is connected with one end of a time integrating capacitor $C_2$. The other end of the time integrating capacitor $C_2$ is connected with the power supply. A trigger switch $S_4$ is disposed in parallel relation with the capacitor $C_2$. The contact 2 of the switch $S_3$ is connected with the central tap M of a manually operated variable resistor $R_{20}$ for providing a manual selection of shutter speed. A resistor $R_{21}$ and a switch $S_5$ interconnected with the shutter release button are provided for a bulb operation circuit. An NPN type transistor $Q_{17}$ is provided for allowing indication on an indicator, and has a base connected to the base of the NPN type transistor $Q_{15}$. Between the emitters of the transistors $Q_{17}$ and $Q_{15}$, there is connected a negative feedback resistor $R_{19}$. A level shifting diode $Q_{16}$ is connected between the emitter of the transistor $Q_{15}$ and ground, and an indicator A is disposed between the collector of the transistor $Q_{17}$ and the power supply. A resistor $R_{18}$ is provided between the collector of the NPN type transistor $Q_{15}$ and the ground for closing the shutter in about ten seconds after it is opened, under the "automatic" position, even when the amount of light is insufficient to close the shutter. The output of the timing capacitor $C_2$ is applied to the gate of the field effect transistor $F_5$.

A resistor $R_{22}$ is provided as the source resistor for the field effect transistor $F_5$, and a variable resistor $R_{23}$ is disposed between the source of the transistor $F_5$ and ground for adjusting the trigger level. The character $R_{24}$ designates a drain resistor for the transistor $F_5$, through which the output of the transistor is taken out. The NPN type transistors $Q_{18}$ and $Q_{19}$, the resistors $R_{25}$, $R_{26}$, $R_{27}$ and $R_{28}$, the solenoid Ry and the diode $Q_{20}$ constitute a Schmitt trigger circuit which controls the supply of current to the solenoid Ry or the load of the collector of the NPN type transistor $R_{19}$ in accordance with the output of the field effect transistor $F_5$. The diode 20 is provided for preventing the NPN type transistor from being damaged due to the transient phenomenon produced during the switching of the Schmitt trigger circuit. A switch $S_6$ is provided to be actuated by the shutter release button for completing a line to the power supply.

In the arrangement of the second embodiment, a typical operation for taking a picture will now be described.

Referring to the operation in which shutter speed is automatically determined in accordance with the amount of light from the object to be taken, the speed or sensitivity of a film and the lens aperture opening, all of the switches are positioned at the position 1 before the shutter release button is depressed. The switch $S_3$ is always in the position 1 irrespective of the actuation of the shutter release button. Since the switch $S_5$ has no contribution in this automatic photographing, it will not be described further. Before a picture is taken, an adjustment is made in accordance with the film speed by adjusting the resistor $R_2$ through a film speed knob on the camera. Thereafter, the lens aperture opening is determined. In a camera having a lens with a manually operated aperture diaphragm, the light which has passed through the aperture opening is measured by the photo sensitive element. When the lens of the camera has a pre-set type aperture diaphragm, the light is measured with a full open lens aperture which is closed to a preset position just before the shutter is actuated. Therefore, in the former case, the resistor $R_3$ for determining the amplification factor of the photo current may be of a fixed type since the photo current changes in proportion to the lens aperture opening. However, in the latter case, the resistor $R_3$ must be adjusted in accordance with the pre-set value of the aperture so that the current is proportional to the pre-set value.

After the lens aperture opening is determined, the shutter release button is depressed. Then, the switch $S_6$ is actuated to close the position 2, so that the power supply is connected and the measurement is started. Thus, the photo current $I_p$ corresponding to the amount of light is allowed to flow through the silicon photo diode Ph.D and then through the resistor $R_3$. By this current, the gate $G_2$ of the transistor $F_2$ is subjected to a positive potential and the drain potential of the transistor $F_2$ is decreased. This turns the collector potential of the NPN transistor $Q_7$ to a positive potential, the collector potential of the NPN transistor $Q_9$ and the gate potential of the field effect transistor $F_3$ to negative potential, the drain potential of the field effect transistor $F_4$ and the base potential of the NPN transistor $Q_{14}$ to negative potential, the collector potential of the NPN type transistor $Q_{14}$ and the base potential of the NPN type transistor $Q_{15}$ to positive potential, and the collector potential of the NPN type transistor $Q_{15}$ to a negative potential. The potential in the collector of the transistor $Q_{15}$ is applied through the switch $S_2$ to the gate $G_2$ of the field effect transistor $F_2$, so that there is no substantial change in the potential at the gate $G_2$ due to the negative feedback. Under a condition in which the open loop gain of the feedback amplifier is high, it may be considered that the input voltage between the transistor $F_1$ and $F_2$ is substantially zero. Therefore, the current I flowing through the resistor $R_2$ and the feedback loop can be represented by the following equation.

$$I = \frac{R_3}{R_2} \times I_p \quad (12)$$

When the resistance value of the resistor $R_3$ is large as compared with that of the film speed adjusting resistor $R_2$, the photo current is amplified and thereafter introduced into the collector of the NPN type transistor $Q_{15}$. In this instance, a voltage corresponding to the amount of light appears across the storage capacitor $C_1$. As apparent from the equation (12), an adjustment can be made in accordance with the film speed by adjusting the resistor $R_2$ to change the current gain.

In this instance, in the indicator A, there is indicated a shutter speed which is determined in accordance with the film speed, the lens aperture opening and the amount of light. When the shutter release button is further depressed, the switch $S_1$ is actuated to close the contact 2 and also the switches $S_2$ and $S_4$ to close the contacts 2 just before the mirror of the camera is pulled up. It should of course be noted that, in a camera in which measurement of light is performed with the lens aperture fully opened, the switch $S_1$ must be actuated before the lens aperture diaphragm is moved to a predetermined position during the shutter release. The switches $S_2$ and $S_4$ may be actuated in this order after the switch $S_1$ is actuated. The memorizing function is started when the switch $S_1$ is actuated to the position 2, and when the switch $S_2$ is actuated to the position 2, a current corresponding to the voltage stored in the storage capacitor $C_1$ flows from the power supply through the switch $S_4$ to the collector of the NPN transistor $Q_{15}$. If the stored voltage is of a correct value, the current is equal to that which has been flowing through the negative feedback loop to the collector of the NPN type transistor $Q_{15}$ during the measurement of the amount of light. The trigger switch $S_4$ is actuated to the position 2 or to the open position when the shutter is opened. Then, the timing capacitor $C_2$ is charged by the current corresponding to the stored voltage. As the voltage in the timing capacitor reaches a predetermined level, the field effect transistor $F_5$ becomes conductive and a current flows therethrough, so that the base potential of the NPN type transistor $Q_{18}$ is raised. Thus, the transistor $Q_{18}$ is turned on and the NPN transistor $Q_{19}$ is turned off to interrupt the current to the solenoid so as to close the shutter. The shutter speed corresponds to the time from the actuation of the switch $S_4$ to the interruption of the solenoid current. This is represented by the following equation;

$$t = \frac{C_2 \cdot V_T}{I} = \frac{C_2 \cdot V_T}{I_p \times R_3/R_2} \quad (13)$$

where $t$ is the shutter speed, $V_T$ is the trigger voltage and $I$ is the collector current of the NPN transistor $Q_{15}$ which may be referred to as "time integrating current".

Referring to the equation, the shutter speed $t$ can be determined by the time integrating current $I$ when the value $C_2 . V_T$ is constant. The error inherent in the capacitor $C_2$ and the silicon photo diode Ph.D can be compensated for through the adjustment of the trigger voltage $V_T$. The adjustment of the trigger voltage is performed through the variable resistor $R_{23}$ which varies the voltage between the gate and source electrodes of the field effect transistor $F_5$. A typical example of determining the shutter speed using the equation (13) will now be described. Assuming that capacitance of the time integrating capacitor is 1$\mu$ F and the trigger voltage is 3 V, the value $C_2 \times V_T$ is equal to $3 \times 10^{-6}$ coulomb. With a film having a sensitivity of ASA 100, it is assumed that, under the amount of light $L_1$, a suitable exposure can be obtained with the lens aperture opening F = 1.4 and the shutter speed of 1/1000 second. It is further assumed that the photo current in this instance is 3 $\mu$ A. From the equation (13), it is noted that the time integrating current I must be $3 \times 10^{-6} \times 1000$ = 3 mA in order to obtain the shutter speed of 1/1000 second. Thus, from the equation (12), it will be seen that the value $R_3/R_2$ is 1000. Therefore, when the resistance value of the film speed adjusting resistor $R_2$ is 100Ω, the resistance value of the resistor $R_3$ is 100KΩ. Under the same amount of light $L_1$, with a film having a sensitivity of ASA 50, the resistance value of the resistor $R_2$ is selected as 200Ω to reduce the photo current amplification factor to one-half. Thus, the time integrating current I is divided by two and the shutter speed of 1/2000 is obtained to achieve the correct exposure. For a film having the sensitivity of ASA 200, the resistor $R_2$ is adjusted to 50Ω to obtain a similar result.

Next, the effect of adjustment of lens aperture will be described. In a camera having a lens with a manually operated aperture diaphragm, when the aperture is closed from F = 1.4 to F = 2, the amount of light incoming to the silicon photo diode Ph.D is reduced to one half, so that the photo current $I_p$ will become 1.5$\mu$A. For a film having the sensitivity of ASA 100, the value $R_3/R_2$ = 1000, so that the time integrating current I becomes 1.5 mA and the shutter speed of 1/500 can be obtained. When the light is measured with a fully opened aperture diaphragm, the resistor $R_3$ is interconnected with the aperture diaphragm so that the resistance value of the resistor is adjusted in accordance with the preset value of the lens aperture. For example, when the aperture is reduced to a pre-set value of F = 2 when the picture is taken, the resistance value of the resistor $R_3$ is reduced to 50kΩ which is one half of the resistance value for the aperture pre-set value of F = 1.4. Then, the time integrating current is correspondingly reduced for the same photo current $I_p$, so that the shutter speed of 1/500 can be attained to obtain a suitable exposure. With the same aperture opening and the same film speed, when the amount of light is increased from $L_1$ to $2 \times L_1$, the photo current is doubled and therefore the shutter speed is reduced to one-half, so that a suitable exposure is obtained. As described above, an automatic exposure control can be made.

A manual exposure control in which the shutter speed is manually determined through a shutter control knob will further be described. For this operation, the switch $S_3$ is actuated to the position 2. During the manual operation, the feedback amplifying circuit operates only for indicating the shutter speed on the indicator. The shutter speed is determined by the product of the variable resistor $R_{20}$ and the time integrating capacitor $C_2$. The shutter speed $t$ during the manual operation can be represented by the following equation, representing the power supply voltage by the character Vcc.

$$V_T = Vcc(1 - e - \frac{t}{R_{20} \times C_2}) = Vcc \times \frac{t}{R_{20} \times C_2}$$

Therefore: $$t = R_{20} \times C_2 \times \frac{V_T}{Vcc} \qquad (14)$$

The sequence of actuation of the switches is the same as in the case of the automatic exposure control, and the time integrating capacitor $C_2$ is charged through the resistor $R_{20}$. From the above descriptions, it will be apparent that the time integrating capacitor $C_2$ operates both in the automatic exposure control and in the manual exposure control.

Next, a "bulb" operation is described in which the shutter is opened as long as the shutter release button is depressed. This operation is substantially the same as in the manual exposure control except that the switch $S_5$ is actuated to the position 2 before the switch $S_4$ is moved to the position 2, so that the time integrating capacitor $C_2$ is not charged even when the switch $S_4$ is actuated and therefore the shutter is maintained in the open position. When the shutter release button is released, the switch $S_5$ is returned to the position 1, so that the time integrating capacitor $C_2$ is charged through the resistor $R_{21}$ and, as the charged voltage reaches the trigger voltage $V_T$, the shutter is closed.

In using a self-timer, since the mirror is pulled up when the shutter release button is depressed, it is necessary to start to memorize just before the mirror is pulled up and maintain the memory for about 10 seconds. Since a tantalum solid electrolytic capacitor having less leak current is used as the storage capacitor $C_1$ and one end of the capacitor is connected with the field effect transistor $F_3$ which is a high input impedance element, the change in the stored voltage will have no problem in a normal operation in which the storing time is very short. However, due to the leak of the capacitor and the field effect transistor, it is very difficult to maintain the storage voltage for about ten seconds. Generally, the leak current of a junction type field effect transistor has a leak current of $10^{-10}$ to $10^{-12}$ A which is sufficiently small as compared with the leak current $10^{-6}$ to $10^{-8}$ A of a tantalum solid electrolytic capacitor. Therefore, it may be sufficient to make a compensation only for the leak current of the capacitor. For this purpose, a capacitor $C_3$ is connected in series with the storage capacitor $C_1$, whereby the capacitor $C_1$ is additionally charged from the power supply through the capacitor $C_3$ to compensate for the voltage drop in the capacitor $C_1$ due to the leak produced therein. Thus, it is possible to maintain the stored voltage for an extended time.

The operation of the indicating circuit comprising the resistor $R_{19}$, the NPN type transistor $Q_{17}$ and the indicator A will now be described. Representing the voltage between the base and the emitter of each of the transistors $Q_{15}$ and $Q_{17}$ by $V_{BE}$ and $V_{BE}$, respectively, the emitter current by $I_E$ and $I_E$, respectively, the following relation is established among the values $V_{BE}$, $V_{BE}$, $I_E$ and $I_E$.

$$I_E = I_o \exp (q V_{BE} /kT) \qquad (15)$$

$$I_E = I_o \exp (q V_{BE} /kT) \qquad (16)$$

$$V_{BE} = V_{BE} + I_E . R_{19} \qquad (17)$$

where: $q$ is the charge of an electron, $T$ is the absolute temperature, $k$ is Boltzmann's constant, $I_o$ is the dark current of the transistors $Q_{15}$ and $Q_{17}$, and $R_{19}$ is the emitter resistance of the transistor $Q_{17}$. From the equations (15), (16) and (17), the following equation can be obtained.

$$ln\ I_E = \frac{q}{kT} R_{19} I_E + ln\ I_E \qquad (18)$$

In the equation (18), if the first item of the right column is large in relation to the second item, the emitter current $I_E$ of the transistor $Q_{17}$ is equal to the logarithmic compression of the emitter current $I_E$ of the transistor $Q_{15}$. The emitter current of the transistor $Q_{15}$ is equal to the collector current of the same transistor, that is, the time integrating current $I$, and the emitter current $I_E$ is equal to the current in the indicator A, so that the time integrating current I is indicated on the indicator A in the form of a logrithmic compression due to the effect of the emitter resistance $R_{19}$ of the transistor $Q_{17}$.

Under a condition in which the time integrating current I is zero or so small that it cannot charge the time integrating capacitor $C_2$, as in the case in which the shutter release button is depressed with the lens cover on the lens or under insufficient light, the shutter may possibly be maintained in the open position or will not be closed until a very long time passes. In order to eliminate this undesirable result, the resistor $R_{18}$ is inserted between the collector of the transistor $Q_{15}$ and ground. When the shutter release button is depressed, the power switch $S_6$ is closed, and thereafter the switch $S_1$ is opened and the switch $S_2$ is actuated from the position 1 to the position 2. If the amount of light is not sufficient, the collector current of the transistor $Q_{15}$ can be considered as being substantially zero if the resistor $R_{18}$ is not provided. However, due to the existence of the resistor $R_{18}$, the time integrating capacitor $C_2$ can be charged with a time constant corresponding to $R_{18} \times C_2$ even when the time integrating current is zero. Therefore, the shutter is closed after a predetermined time. It should of course be noted that the time constant $R_{18} \times C_2$ may produce an error in the shutter speed under a small amount of light, it should be sufficiently large in relation to the maximum shutter speed. In case of a camera having a maximum shutter speed of 1 second, the time constant may be about 10 seconds.

Figure 7:
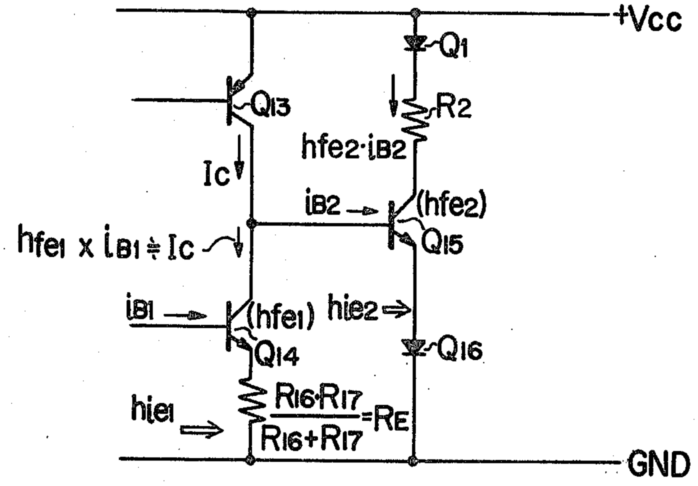
FIG. 7 is a circuit diagram showing the essential part of the embodiment shown in FIG. 6; and, FIG. 8 is a circuit diagram showing a further embodiment of the present invention.

FIG. 7 shows an essential portion of the amplifier used in the circuit shown in FIG. 6 which will now be described in detail. In the circuit including the NPN type transistors $Q_{14}$ and $Q_{15}$, the PNP type transistor $Q_{13}$, the resistors $R_2$, $R_{16}$ and $R_{17}$ and the diodes $Q_1$ and $Q_{16}$, representing the current amplification factors of the NPN transistors $Q_{14}$ and $Q_{15}$ by $h_{fe1}$ and $h_{fe2}$, respectively, the base currents by $i_{B1}$ and $i_{B2}$, respectively, the emitter resistances by $R_{E1}$ and $R_{E2}$, respectively, the input impedances by $h_{ie1}$ and $h_{ie2}$, respectively, the voltage gains by $V_{G1}$ and $V_{G2}$, and the collector current of the PNP type transistor $Q_{13}$ by $I_C$, the voltage gains $V_{G1}$ and $V_{G2}$ can be represented as follows.

$$V_{G1} = \frac{h_{fe1} \times i_{B1} \times h_{ie2}}{h_{ie1} \times i_{B1}} = \frac{h_{fe1} \times h_{fe2} \times R_{E2}}{h_{fe1} \times R_{E1}} = \frac{R_{E2}}{R_{E1}} \times h_{fe2}$$

$$V_{G2} = \frac{h_{fe2} \times i_{B2} \times R_2}{h_{ie2} \times i_{B2}} = \frac{h_{fe2} \times R_2}{h_{fe2} \times R_{E2}} = \frac{R_2}{R_{E2}}$$

Thus, the gain of the whole circuit $V_{G1} \times V_{G2}$ can be represented by the following equation.

$$V_{G1} \times V_{G2} = \frac{R_{E2} \times h_{fe2}}{R_{E1}} \times \frac{R_2}{R_{E2}} = h_{fe2} \times \frac{R_2}{R_{E1}}$$

The value of the resistance $R_{E1}$ can be represented in terms of the emitter current of the transistor $Q_{14}$ by the equation $R_{E1} = 26/I_E$ (mA) Ω. Since the current $I_E$ is substantially equal to the collector current $I_c$ of the transistor $Q_{13}$ which is maintained at a substantially constant value, the emitter resistance of the transistor $Q_{14}$ can be considered as being substantially constant. Thus, as apparent from the equation (19), if the current amplification factor $h_{fe2}$ is substantially constant irrespective of the current, the total gain of the circuit is also constant irrespective of the collector current of the transistor $Q_{15}$.

Figure 8:
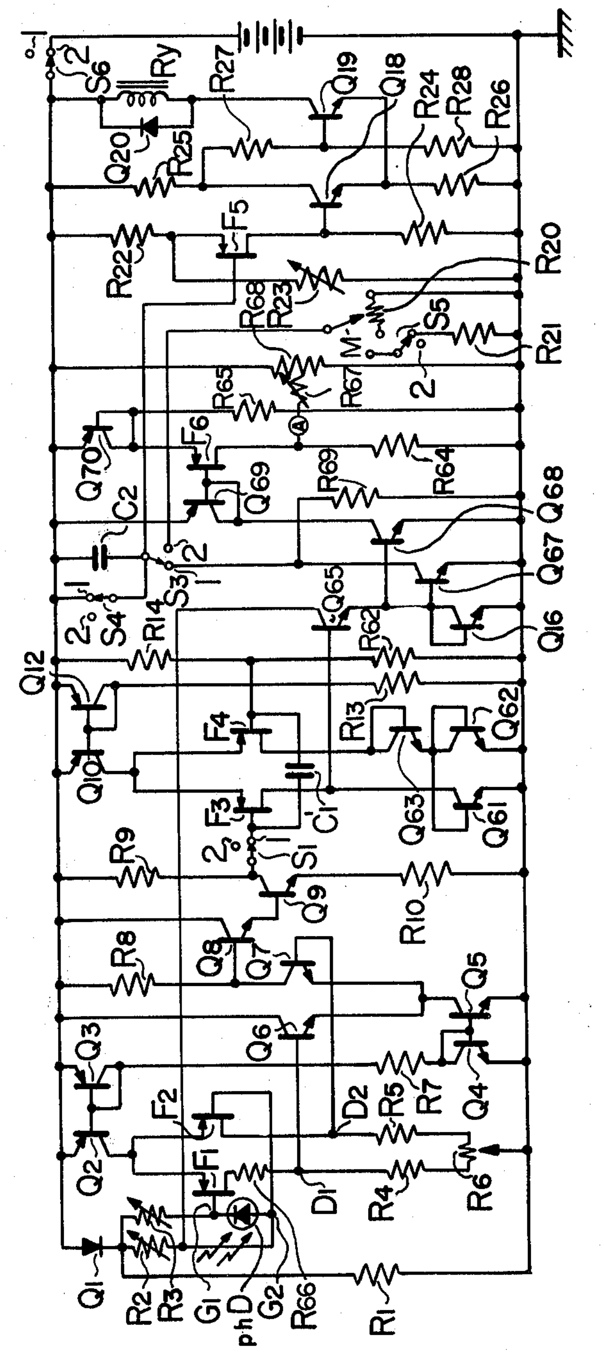

FIG. 8 shows a third embodiment of the present invention. The circuit is substantially the same as that shown in FIG. 6, so that the only differences between the arrangements of FIGS. 6 and 8 will now be described. In the arrangement of FIG. 8, a resistor $R_{66}$ is inserted between the drain of the field effect transistor $F_1$ and the resistor $R_4$ for preventing the voltage, which is produced due to a slight difference between gm of the field effect transistors $F_1$ and $F_2$ when the gate voltages of the transistors $F_1$ and $F_2$ are reduced, from being fedback positively in the whole circuit to cause an oscillation.

The storage capacitor $C'_1$ is inserted between the gates of the field effect transistors $F_3$ and $F_4$, the common source of the transistors $F_3$ and $F_4$ being connected to the collector of a PNP transistor $Q_{10}$ which constitutes a constant current source by being connected at its base and emitter with the base and emitter of a PNP type transistor $Q_{12}$.

The collector of an NPN type transistor $Q_{61}$, which constitutes a constant current source together with an NPN type transistor $Q_{62}$ by being connected at its base and emitter with those of the transistor $Q_{62}$, is connected to the drain of the field effect transistor $F_3$ and to the base of an NPN type transistor $Q_{65}$. A diode $Q_{63}$ is connected between the drain of the transistors $F_4$ and diode $Q_{62}$. The gate of the field effect transistor $F_4$ is connected to the junction of resistors $R_{11}$ and $R_{62}$. A resistor $R_{13}$ is provided for determining the constant current through the transistors $Q_{10}$ and $Q_{12}$, and is inserted between the junction of the base and collector of transistor $Q_{12}$, and ground. The collector of the transistor $Q_{65}$ is connected to the gate $G_2$ of the field effect transistor $F_2$ and is directly fed back to the input stage. The emitter of the transistor $Q_{65}$ is connected to the base-collector junction of a diode $Q_{16}$, and to the bases of NPN type transistor $Q_{67}$ and $Q_{68}$. The collector of the transistor $Q_{67}$ is connected with the contact 1 of a selector switch $S_3$ which is provided for selecting an "automatic" position in which the shutter speed is automatically determined and a "manual" position in which the shutter speed is manually determined as desired. The switch $S_3$ is connected to one end of a time integrating capacitor $C_2$, the other end of the capacitor $C_2$ being connected to the power supply. A trigger switch $S_4$ is connected in parallel with the capacitor $C_2$ and has a contact 2 connected with the central tap M of a variable resistor $R_{20}$ for the purpose of allowing manual selection of shutter speed. A resistor $R_{21}$ and a switch connected with a shutter release button (not shown) are provided for a bulb operation.

The collector of the NPN type transistor $Q_{68}$ is connected to a diode $Q_{69}$ and the gates of a field effect transistor $F_5$ so as to supply to the diode $Q_{69}$ a current equal to the collector corrent of the NPN type transistor $Q_{15}$. Between the source of the field effect transistor $F_5$ and the power supply, there is connected a diode $Q_{70}$ having a constant terminal voltage due to the existence of a resistor $R_{15}$. The field effect transistor $F_5$ detects the differences between the terminal voltage of the diode $Q_{69}$ and the constant terminal voltage of the transistor $Q_{20}$ and produces an output current corresponding to the difference. The drain of the transistor $F_5$ is connected to one end of an ammeter A, the other end of the ammeter A being connected with a variable resistor $R_{67}$ for adjusting the maximum swing angle of the ammeter A. The variable resistor $R_{67}$ is also connected to another variable resistor $R_{68}$.

A resistor $R_{22}$ is provided as a source resistance of a field effect transistor $F_5$, and a trigger level adjusting variable resistor $R_{23}$ is connected between the source of the transistor $F_5$ and ground. The character $R_{24}$ designates a drain resistance for the field effect transistor $F_5$, through which the output of the transistor $F_5$ is taken out.

NPN type transistors $Q_{18}$ and $Q_{19}$, resistors $R_{25}$, $R_{26}$, $R_{27}$ and $R_{28}$, a solenoid Ry and a diode $Q_{20}$ are provided for constituting a Schmitt trigger circuit which controls the current through the solenoid Ry which is the collector load of the NPN type transistor $Q_{19}$ in accordance with the output of the field effect transistor $F_5$. The diode $Q_{20}$ serves to prevent the NPN type transistor $Q_{19}$ from being damaged during a transient phenomenon produced by the switching of the Schmitt trigger circuit. A switch $S_6$ is provided for establishing the line from the power supply and is actuated by the shutter release button of the camera.

In the arrangement as described above, a typical operation of the circuit will now be explained. The operations of the automatic exposure control and the manual exposure control are the same as those in the embodiment of FIG. 6, so that they will not be described further.

When a self-timer is used, since the reflecting mirror is pulled up as soon as the shutter release button is depressed, it is necessary to start to memorize before the mirror is pulled up and maintain the memory for about ten seconds. Since a tantalum solid electrolytic capacitor having a very low leak current is used as the storage capacitor $C'_1$ and the capacitor is inserted between the gates of the field effect transistors $F_3$ and $F_4$, which gates constitute input terminals of the high input impedance differential amplifying circuit, the voltage applied to the capacitor $C'_1$ is substantially zero as will be described later so that the leak current of the capacitor can be neglected. Therefore, it is possible to maintain the stored voltage during the operation of the self-timer.

Next, reference will be made to the indicating circuit comprising the diodes $Q_{69}$ and $Q_{70}$, the field effect transistor $F_5$, the resistors $R_{64}$ and $R_{65}$, variable resistors $R_{67}$ and $R_{68}$, the ammeter A and the NPN type transistor $Q_{68}$.

The voltage across the base and the emitter of the transistor $Q_{68}$ is equal to the terminal voltage of the diode $Q_{16}$, so that there appears in the collector of the transistor $Q_{68}$ and thereof in the diode $Q_{69}$ a current equal to the collector current of the transistor $Q_{65}$. Representing the voltage in the diode $Q_{69}$ by $V_{BE1}$, it can be represented by the following equation:

$$V_{BE1} = \frac{kT}{q} \; ln \; \frac{I_1}{I_o} \qquad (20)$$

where: $k$ is Boltzmann's constant, $T$ is the absolute temperature, $q$ is the charge of an electron, $I_1$ is the current in the diode $Q_{69}$, and $I_o$ is the dark current.

Since there is flowing in the diode $Q_{70}$ a current $I_2$ determined by the power supply voltage and the resistor $R_{65}$, the terminal voltage $V_{BE2}$ appearing on the diode $Q_{70}$ due to the current $I_2$ can also be represented by the following equation.

$$V_{BE2} = \frac{kT}{q} \; ln \; \frac{I_2}{I_o} \qquad (21)$$

Since the voltage $V_{GS}$ across the gate and the source of the field effect transistor $F_6$ is equal to $V_{BE1} - V_{BE2}$, the voltage can be represented by the following equation:

$$V_{GS} = V_{BE1} - V_{BE2} = \frac{kT}{q} \; ln \; \frac{I_1}{I_2} \qquad (22)$$

From the equation (22), the drain current $I_{DS}$ of the field effect transistor $F_6$ can be written as follows:

$$I_{DS} = g_{mo} \; V_{GS} = g_{mo} \; \frac{kT}{q} ln \; \frac{I_1}{I_2} = a \; ln \; I_1 - b \qquad (23)$$

where: $g_{mo}$ is the mutual conductance of the field effect transistor $F_6$ and $a$ and $b$ are constants.

The current in the diode $Q_{69}$ is substantially equal to the collector current of the NPN type transistor $Q_{65}$ so that the drain current of the field effect transistor $F_5$ is equal to a logarithmic compression of the collector current of the NPN transistor $Q_{65}$ subtracted by a certain current.

In the third embodiment described above, only one diode is inserted into the logarithmic compression circuit, however, it should be noted that other impedance element may be inserted in series with the diode or a plurality of diodes may be used so as to determine the compression ratio as desired.

By adjusting the variable resistor $R_{68}$ to cancel the current corresponding to the constant $b$ in the equation 23 and by adjusting the variable resistor $R_{67}$ to suitably determine the constant $a$, the ammeter A can indicate the shutter speed very exactly throughout a desired range.

A portion of the amplifier used in the circuit will now be described in detail. In the circuit comprising the field effect transistors $F_3$ and $F_4$, the NPN type transistors $Q_{61}$ and $Q_{65}$, the PNP type transistor $Q_{10}$, the diodes $Q_{62}$, $Q_{63}$ and $Q_{12}$, the resistors $R_2$, $R_{14}$, $R_{62}$ and $R_{13}$, and the capacitor $C'_1$, representing the mutual conductance of the field effect transistors $F_3$ and $F_4$ by $g_m$, the input impedance including the drain of the transistor $F_3$ and the base of the NPN type transistor $Q_{65}$ by $h_{ie}$, and the current amplification factor of the transistor $Q_{65}$ by $h_{fe}$, the gain A of the circuit can be represented as follows.

$$A = g_m \times h_{ie} \times \frac{h_{fe} R_1}{h_{ie}} = g_m \; R_1 \times h_{fe} \qquad (24)$$

From the equation (24), it should be noted that there is no substantial change in the gain even if there is a great change in the collector current of the NPN type transistor $Q_{65}$, assuming that the current amplification factor $h_{fe}$ of the NPN type transistor $Q_{65}$ is less dependent on the current.

Further, the voltage $V_1$ across the storage capacitor $C_1$ can be represented as follows:

$$V_1 = \frac{V_o}{A} = \frac{IR_2}{g_m R_1 h_{fe}} = \frac{I}{g_m h_{fe}} \qquad (25)$$

where; $V_o$ is the output voltage of the transistor $Q_{65}$ and $I$ is the output current of the transistor $Q_{65}$. Assuming that $g_m$ is 1 mv, $h_{fe}$ is 100, and $i_o$ is 1$\mu$A to 10 mA, the value $V_1$ is $10^{-5}$ to $10^{-1}$ V. Thus, the value $V_1$ is negligible. In general, when a voltage is applied to a capacitor and thereafter removed, the leak current of the capacitor increases in proportion to the applied voltage. Therefore, when the applied voltage is substantially zero as in the aforementioned case, the leak current is negligibly small. Thus, it will be understood that it is possible to maintain the storage voltage for a time required for the operation of a self-timer.

According to the present invention, since a timing capacitor $C_2$ is charged by the output current proportional to a photo current, the charged voltage changes linearly with respect to the charging time so that it is possible to determine the trigger level as desired for determining the shutter speed.

Although in a conventional exposure control device a correct shutter speed can be obtained only in the range in which the photo current is proportional to the amount of light, the circuit of the present invention makes it possible to obtain a correct shutter speed even under a dark condition in which the dark current cannot be neglected, by subtracting the dark current from the photo current. Further, according to the present invention, the photosensitive element is used with the voltage across the element being substantially zero, so that the measurable range can substantially be increased as compared with an arrangement in which the photosensitive element is used with a bias.

In a conventional device, particular means has been provided for performing logarithmic compression or expansion of current is order to make the shutter speed correspond to the amount of light. However, according to the present invention, it is possible to obtain a photo current proportional to the amount of light by simply disposing resistors at the opposite ends of the photosensitive element and providing a circuit for amplifying the output at the junction point whereby the output is fed back to said resistors to control the current through the resistors. The circuit may be either of voltage amplifying type or current amplifying type to provide the same result. According to the exposure control circuit of the present invention, the amount of light can easily be compressed logarithmically so as to provide an easy indication of the shutter speed. It further appears that the present invention provides an effective means for compressing current. According to the present invention, the time integrating capacitor can be employed both in the automatic exposure control and in the manual exposure control, so that it is possible to reduce the number of components and to eliminate the error in the exposure value between the automatic and manual exposure controls.

According to a further aspect of the present invention the resistors which determine the amount of feedback in the amplifier having a negative feedback circuit are adjusted in accordance with the lens aperture or the film speed, so as to perform an exposure control by measuring the light with the lens aperture fully opened. Of course, by using a fixed resistance in lieu of the resistor which is adjusted in accordance with the lens aperture, it becomes possible to measure the light with lens aperture adjusted to a desired position.

According to the present invention, it is also possible to compensate for any error in the shutter speed which may be caused by the manufacturing error in the capacity of the time integrating capacitor or in the sensitivity of the photo sensitive element, simply by varying the trigger voltage. Therefore, the adjustment is very easy and a correct shutter speed can be obtained. According to a further feature of the present invention, an additional capacitor is disposed in series with the storage capacitor so as to compensate for the voltage drop caused by the leak in the storage capacitor. Therefore, it is possible to maintain the storage voltage for a sufficiently long time and thus to obtain a correct exposure time. Further, in the output current storage section of the present invention, the storage capacitor is connected between the control terminals of the high input impedance differential amplifier to reduce the potential difference between the opposite ends of the storage capacitor. Thus, it is possible to reduce the voltage drop due to the leakage in the storage capacitor to a substantially negligible value and therefore to maintain the storage voltage for a long time.

According to a further feature of the present invention, a constant current source is connected to the junction point between a first transistor and a second transistor, so that even when the base current of the second transistor changes through a wide range, the voltage gain obtained by the first and the second transistors can be made substantially constant. Thus, it is possible to reduce the deviation of the output-to-input relationship from a linear relation. Further, according to the present invention, it is possible to easily obtain the bulb operation electrically by providing a switch interconnected with the shutter release button of camera.

In the exposure control circuit of the present invention the trigger circuit is directly driven by the current in the output circuit, so that it is possible to obtain a correct trigger current which is equal to the output current irrespective of any change in the temperature and in the power supply voltage. Further, it is possible to perform a control through a wide range of current. Since the indicating circuit is also driven by the current in the output circuit, it is possible to obtain a correct indication on an indicator with an indicator current equal to the output current irrespective of the outside temperature and the power supply voltage. Thus, it is possible to obtain an indication which is substantially free from any influence of external conditions. Further, correct indication can be assured throughout a wide range. The indicating circuit can also be used as a portion of the exposure control circuit employing logarithmic compression or expansion.

In a conventional arrangement, the shutter speed control circuit can be controlled only by memorizing the output of the light measuring circuit. However, according to the present invention, the shutter speed control circuit can be controlled directly by the light measuring circuit. Therefore, the exposure control circuit of the present invention is not limited to an application to a camera in which exposure value is determined by measuring the light which has passed through the lens of the camera.

According to the present invention, even when there is a substantial change in the differential output, the gain of the circuit itself scarcely changes so that it is possible to reduce a deviation of the input-to-output relation from a linear relation.

Although the invention has thus been shown and described with reference to specific embodiments, such as an exposure control device for cameras, the principle and circuit arrangements disclosed and claimed in this application, have a wide application to fields other than cameras, for example, a photosensor device employed in facsimiles and duplicating apparatus, and a dimmer for a strobo. Therefore, it should be noted that the invention is in no way limited to the details of the embodiments but various changes, modification can be made without departing from the scope of the appended claims.

What is claimed is:

1. An exposure control system for use in a photographic camera, comprising: differential amplifier means having first and second inputs; a photoelectric transducer coupled across said first and second inputs; first impedance means coupled between said first input and an electrical supply source; second impedance means coupled between said second input and said supply source; means coupling an output of said differential amplifier means to one of said first and second inputs to negatively feed back a portion of the output signal from said amplifier means to said one input such that a photocurrent generated by said photoelectric transducer is amplified by the ratio of said first and second impedances; and means coupling said differential amplifier means to exposure control means of said camera to control the operation of the camera shutter as a function of the amplitude of said photocurrent.

2. An exposure control system as defined in claim 1, further comprising storage means coupled to the output of said differential amplifier means for storing an electrical signal representing the photocurrent generated by said photoelectric transducer.

3. An exposure control system as defined in claim 2, further comprising: a constant current source coupled to said storage means for producing a signal having a constant current characteristic; a time integrating circuit coupled to said constant current source; and means coupling said time integrating circuit to said exposure control means to control the closing of the shutter of said camera as a function of the rate of integration of said time integrating circuit.

4. An exposure control system as defined in claim 3, wherein said storage means comprises first capacitance means coupled to an input of said constant current source and said time integrating circuit comprises second capacitance means coupled to an output of said constant current source.

5. An exposure control system as defined in claim 3, wherein an output of said constant current source is coupled to said one input of said differential amplifier means to feed back said constant current signal to said differential amplifier means.

6. An exposure control system as defined in claim 5, further comprising means to switch the output of said constant current source between said one input of said differential amplifier means and the input of said time integrating circuit.

7. An exposure control system as defined in claim 1, further comprising: a transistor coupled to one output of said differential amplifier means; and a diode coupled to a second output of said differential amplifier means, said diode being connected across the base and emitter electrodes of said transistor; wherein said one output of said differential amplifier means is coupled to said negative feedback means.

8. An exposure control system as defined in claim 1, wherein said first impedance means comprises a variable resistance element coupled to the lens aperture setting mechanism of the camera.

9. An exposure control system as defined in claim 8, wherein said second impedance means comprises a variable resistance element coupled to the film speed setting mechanism of the camera.

10. An exposure control system as defined in claim 1, further comprising: a first transistor having its input coupled to the output of said differential amplifier means; a second transistor having its input coupled to the output of said first transistor and its output coupled to said exposure control means; and a constant current source coupled to the junction between the output of said first transistor and the input of said second transistor.

11. The exposure control system as defined in claim 1, further comprising: a first transistor having its base electrode coupled to the output of said differential amplifier means and its output coupled to said exposure control means; a second transistor having its base electrode coupled in common with the base electrode of said first transistor; a resistance element coupled between the respective emitter electrodes of said first and second transistors; and an indicating means coupled to the output of said second transistor.

12. The exposure control system as defined in claim 1, further comprising: a first transistor having its base electrode coupled to the output of said differential amplifier means and its output coupled to said exposure control means; a second transistor having its base electrode coupled in common with the base electrode of said first transistor; a first diode coupled to the output of said second transistor; a field effect transistor having its gate electrode coupled to the junction between said first diode and the output of said second transistor; a second diode coupled to the source electrode of said field effect transistor; and wherein a constant current is supplied to one of said diodes and a logarithmically compressed variable current is supplied to the other diode.

13. The exposure control system as defined in claim 12, further comprising indicating means coupled to the output of said field transistor, said indicating means being driven by said logarithmically compressed variable current.

14. An exposure control system as defined in claim 1, further comprising: a constant current source coupled to said transducer; and a storage capacitor coupled betwen control terminals of a high input impedance amplifier constituting a portion of said amplifier means for storing a signal representing the photocurrent generated by said transducer.

15. An exposure control system as defined in claim 1, wherein said means coupling said amplifier means to said exposure control means comprises an exposure time conversion circuit including a time integrating capacitor, a trigger switch coupled in parallel with said capacitor, and a control switch coupled to said capacitor and having a first contact coupled to an output of said amplifier means and a second contact coupled to said supply source through a resistance element.

16. An exposure control system as defined in claim 1, further comprising a flash bulb discharge circuit including a time-integrating capacitor, a trigger switch coupled in parallel with said capacitor, a high input impedance circuit adapted to be triggered by the charging or discharging current of said capacitor, and a control switch coupled in series between said capacitor and the input of said high input impedance circuit, the opening of said control switch being controlled by movement of the shutter release mechanism of said camera in a first direction, said trigger switch being opened after said control switch is opened, said capacitor being charged or discharged when said control switch is closed by movement of said shutter release mechanism in a second direction after the shutter of said camera and said trigger switch are opened.

* * * * *